(12) United States Patent
Murase et al.

(10) Patent No.: US 7,863,542 B2
(45) Date of Patent: Jan. 4, 2011

(54) LASER PROCESSING APPARATUS AND LASER PROCESSING METHOD AS WELL AS DEBRIS EXTRACTION MECHANISM AND DEBRIS EXTRACTION METHOD

(75) Inventors: Hidehisa Murase, Kanagawa (JP); Yoshinari Sasaki, Tokyo (JP); Kosei Aso, Kanagawa (JP); Naoki Yamada, Kanagawa (JP)

(73) Assignees: Sony Corporation, Tokyo (JP); Exitech Limited, Oxford (GB)

( * ) Notice: Subject to any disclaimer, the term of this patent is extended or adjusted under 35 U.S.C. 154(b) by 1137 days.

(21) Appl. No.: 11/467,388

(22) Filed: Aug. 25, 2006

(65) Prior Publication Data
US 2007/0145026 A1 Jun. 28, 2007

(30) Foreign Application Priority Data
Dec. 22, 2005 (JP) .............................. 2005-370488

(51) Int. Cl.
*B23K 26/16* (2006.01)
(52) U.S. Cl. ............................ 219/121.68; 219/121.69; 219/121.84
(58) Field of Classification Search ................................. 219/121.67–121.72, 121.84; 264/400, 430
See application file for complete search history.

(56) References Cited

U.S. PATENT DOCUMENTS

| 4,149,062 A | * | 4/1979 | Limmer et al. | 219/121.68 |
| 6,586,707 B2 | * | 7/2003 | Boyle et al. | 219/121.69 |
| 2004/0226927 A1 | * | 11/2004 | Morikazu et al. | 219/121.84 |
| 2008/0219305 A1 | * | 9/2008 | Aubert et al. | 372/34 |

FOREIGN PATENT DOCUMENTS

| JP | 9192870 | 7/1997 |
| JP | 10099978 | 4/1998 |
| JP | 2004153171 | 5/2004 |
| JP | 2004337947 | 12/2004 |
| WO | 2005/120763 | 12/2005 |
| WO | WO2005118210 A1 * | 12/2005 |

\* cited by examiner

*Primary Examiner*—Samuel M Heinrich
(74) *Attorney, Agent, or Firm*—K&L Gates LLP

(57) ABSTRACT

A laser processing apparatus is provided. The laser processing apparatus is for performing pattern processing of a transparent conductive film that is formed on a multilayer film on a substrate by using laser light, includes debris extraction module having a vortex generation mechanism that generates a vortex flow by directing gas into the vicinity of a laser-irradiated portion of the transparent conductive film. The debris extraction module is disposed close to the substrate, and debris before deposition and after deposition on the substrate, which is generated by laser irradiation, is entrapped into the vortex flow to be extracted to the outside with the gas.

11 Claims, 6 Drawing Sheets

LASER PROCESSING APPARATUS AND LASER PROCESSING METHOD AS WELL AS DEBRIS EXTRACTION MECHANISM AND DEBRIS EXTRACTION METHOD

CROSS REFERENCES TO RELATED APPLICATIONS

The present application claims priority to Japanese Patent Application JP 2005-370488 filed in the Japanese Patent Office on Dec. 22, 2005, the entire contents of which is being incorporated herein by reference.

BACKGROUND

The present application relates to a laser processing apparatus and a laser processing method for performing pattern processing on a transparent conductive film that is used for a transparent electrode on a multilayer thin film of a FPD (Flat Panel Display) and the like. Particularly, the present application relates to a laser processing apparatus and laser processing method as well as a debris extraction mechanism and an debris extraction method for removing and extracting debris that is particles and products generated during laser processing based on ablation, thermofusion or composite action thereof in which a surface of a processing object is irradiated with laser light.

A transparent conductive film is used as a transparent electrode of a multilayer film substrate for a flat display panel, of a solar cell and the like. Also a transparent conductive film is widely used as a transparent electrode in the field of electronic paper whose development has been promoted as a future display device, and the use thereof has been expanded. Further, since competition for higher definition and lower costs of a display has become more intensive recently, a transparent conductive film of higher quality and higher productivity may also be required in manufacturing a display.

Such transparent conductive film is typically patterned into a desired shape by a photolithography method. For example, a transparent conductive film made of an ITO (Indium Tin Oxides) film, a ZnO (Zinc Oxides) film or the like is vacuum-coated on a glass, plastic, or silicon wafer substrate or the like, then a resist layer is formed thereon, and the resist layer is exposed by irradiation of light through a photomask having a predetermined pattern. The photomask pattern is transcribed onto the resist layer by performing development and post bake, then a portion of the transparent conductive film not covered with the resist is removed by wet etching, and the remaining resist layer is removed at the end so that the desired pattern of the transparent conductive film is obtained.

However, the photolithography process described above needs a large scale apparatus such as a coater/developer, which causes a problem in view of a facility investment and footprint. In addition, since a large amount of chemical solution such as developing solution is used, there is also caused a problem in view of environmental preservation. Japanese Published Patent Application No. 2004-153171 discloses technology for directly processing a transparent conductive film by using laser light, with which a manufacturing process is simplified by omitting additional photolithography processing.

In the processing using a laser which is disclosed in Japanese Published Patent Application No. 2004-153171, particles and products generated from a surface of a processing object irradiated by the laser light may re-deposit around a processed region. Those products are typically called debris. If such debris re-deposits on a substrate, there is a possibility that desired processing quality and processing accuracy may not be obtained. Certain methods are known for reducing debris, for example:

(i) A method of controlling generation of debris;
(ii) A method of removing debris after the debris deposits on a substrate;
(iii) A method of reducing deposition of debris.

In order to reduce the generation of debris in the above method (i), it is known that blowing an assist gas together with the irradiation of laser light onto a processing object is effective. Japanese Published Patent Application No. 09-192870 discloses a method (hereinafter, referred to as method 1), in which an inner side nozzle is disposed in a laser processing head and an outer side nozzle is disposed to surround an outer circumferential surface thereof. In this method 1, an assist gas is directed toward a processed region from the inner side nozzle, and debris is extracted by sucking the assist gas using the outer side nozzle. Further, a method of decomposing debris or preventing re-deposition thereof by using a predetermined atmospheric gas is known as a method of controlling generation of debris and also it is known that an amount of debris deposited on the processed object can be greatly reduced by performing the laser processing under reduced pressure conditions of about 10 [Pa] (10-2 Torr).

Further, as the method of removing debris after the deposition on the processing object in the above item (ii), Japanese Published Patent Application No. 2004-337947 discloses a laser processing method (hereinafter, referred to as method 2) of sucking debris generated near the processing object together with an assist gas. In this method 2, there is provided a laser processing head for outputting laser light toward the processing object with a nozzle mounted on the side facing the processing object. The processing object is irradiated by the laser light output from the laser processing head together with the assist gas through a gas inlet path of the nozzle, and debris generated near the processing object is sucked together with the assist gas from a circular gas suction hole provided on an outer circumference side of the gas inlet path of the nozzle.

Further, Japanese Published Patent Application No. 10-99978 discloses a method (hereinafter, referred to as method 3) of reducing deposition of debris as described in the above item (iii). In this method 3, a fluid feed apparatus is provided for directing gas onto a surface in the vicinity of a processed region and debris is blown away from the processed region by a suction duct for sucking the fluid provided on the opposite side, and therefore gas is directed and is simultaneously sucked to remove the debris.

A configuration disclosed in the above-described Japanese Published Patent Application No. 10-99978 is explained by referring to FIG. 1. The apparatus shown in FIG. 1 is a laser processing apparatus for stamping a manufacturer's serial number on a glass substrate 4 which is arranged in part of a manufacturing process for manufacturing a predetermined product. Various coating processing and patterning are performed on the glass substrate 4 through a series of manufacturing processes by using a plurality of processing machines. This laser processing apparatus includes: a processing table 7, a laser irradiation apparatus 2, a fluid feed apparatus 11, and a discharge apparatus 10. The processing table 7 determines the position of a stamp region where the manufacturer's serial number is stamped by moving in two directions parallel with a plane of the mounted glass substrate 4. The laser irradiation apparatus 2 stamps the manufacturer's serial number corresponding to the kind of the mounted glass substrate 4 onto a stamp region 8. The fluid feed apparatus 11 has a blow nozzle 12 for directing a fluid to the stamp region 8 of the glass substrate 4 mounted on the processing table 7. The discharge apparatus 10 has a suction duct 9 for sucking the fluid over the stamp region 8. Debris 13 generated by irradiation of laser light 3 on a black matrix 6 of the stamp region 8 is removed when processing the glass substrate 4 by the laser light 3 that is emitted from a laser control apparatus 1 through an objective lens 5 of the laser irradiation apparatus 2.

However, debris is scattered and deposits again even if an assist gas is blown onto the processed region from the inner side nozzle as described in the method 1, and therefore debris may not be removed sufficiently even if suction power of the outer side nozzle is made strong. In addition, even if an atmospheric fluid is sucked by the circular gas suction hole as described in the method 2, there has been such a problem that debris that scatters in every direction may not be extracted completely. Similarly, even if debris is blown away from the surface in the vicinity of the processed region in order to suck and remove debris as described in the method 3, debris may not be sucked completely and therefore a result becomes the same as that the remaining debris is scattered along the flow. In this regard, it has been difficult to remove and extract debris even if the suction power is increased.

It is therefore desirable to efficiently remove debris generated from a processing object when pattern processing is performed by irradiating the object with laser light and to reduce the debris re-deposited on a processing object.

SUMMARY

A debris extraction means according to an embodiment is configured to have a vortex-generation mechanism for generating a vortex flow by directing gas in the vicinity of a laser-irradiated portion of a transparent conductive film when pattern processing of the transparent conductive film formed on a multilayer film on a substrate is performed by using laser light. According to the embodiment, this debris extraction means is provided close to the substrate, and debris before deposition and after deposition on the substrate, which is generated by the laser irradiation, is extracted to the outside together with the gas in the vicinity of the laser-irradiated portion by entrapping the debris into the vortex flow.

According to the aforementioned configuration, debris generated by the laser irradiation is entrapped into the vortex flow and is extracted together with the gas in the vicinity of the laser-irradiated portion, and therefore the debris is collected by the vortex flow near the center of the area irradiated by the laser light so that the debris is extracted efficiently with scattering to the surroundings thereof being controlled.

Further, the debris extraction means according to an embodiment includes: a vortex flow outlet portion provided with a transmission hole being a flow path of the vortex flow leading to an outlet hole as well as being an optical path of the laser light and a vortex-forming portion that is disposed facing the substrate. This vortex-forming portion has a vortex-forming plate in which radial vortex-forming grooves corresponding to a rotational direction of the vortex flow and being continuous with the transmission hole are formed in the surface of this vortex-forming portion facing the substrate. Further, this vortex-forming portion is configured such that gas is brought into the vortex-forming grooves of this vortex-forming plate and the gas forming the vortex flow by flowing in the vortex-forming grooves is discharged from the outlet hole to the outside through the transmission hole of vortex flow outlet portion.

According to the aforementioned configuration, the radial vortex-forming grooves corresponding to the rotational direction of the vortex flow and being continuous with the transmission hole are formed in the surface of the vortex-forming portion facing the substrate that is a processing object. Therefore, the gas brought into this vortex-forming portion flows along the vortex-forming grooves, and so the vortex flow is generated. Further, since debris is entrapped into the vortex flow and discharged upward through the transmission hole, debris is collected around the center of the area irradiated by the laser light and can be extracted efficiently with the scattering thereof to the neighborhood being controlled.

Further, in the above embodiment, a circular groove continuous with the vortex-forming grooves is provided on the outer circumference side on the surface of the vortex-forming plate facing the substrate. Gas is brought in from gas supply holes formed in the circular groove and is supplied to the vortex-forming grooves, and so a gas flow in the same rotational direction as the vortex flow is generated in the circular groove.

According to the aforementioned configuration, the circular groove is provided on the outer circumference side of the vortex-forming plate as a previous stage portion to direct the gas into the vortex-forming plate and the gas is brought into the circular groove. Therefore, the gas brought into is rectified and the gas flow corresponding to the rotational direction of the vortex is generated. Then, the gas flow is supplied to the vortex-forming grooves, thereby forming a less turbulent vortex.

Further, in the above embodiment, gas inlet portions are provided to bring gas into the gas supply holes formed in the circular groove. Those gas inlet portions are installed correspondingly to the disposition of the vortex-forming grooves and being inclined to the windward side in the rotational direction of the vortex flow generated with respect to straight lines connecting the center of the transmission hole and the gas supply holes of the circular groove.

According to the aforementioned configuration, the gas is brought from the gas supply holes into the circular groove provided on the outer circumference side of the vortex-forming plate at a predetermined angle corresponding to the disposition of the vortex-forming grooves, specifically, to the direction of the vortex-forming grooves. Therefore, a circular flow rectified in the direction corresponding to the direction of the vortex-forming grooves can be generated inside the circular groove.

Further, in the above embodiment, a groove width on the side of the circular groove in each vortex-forming groove formed in the vortex-forming plate is larger by a predetermined ratio than a groove width of the same on the side of the transmission hole.

According to the aforementioned configuration, a flow velocity of the gas discharged from each vortex-forming groove can be accelerated by providing an opening ratio with respect to the groove width of the vortex-forming groove, and the gas is collected around the center portion of the vortex-forming plate so that debris can be easily entrapped into the vortex flow.

Furthermore, in the above embodiment, a space for forming a circular flow is provided between the transmission hole of the vortex flow outlet portion and the vortex-forming grooves of the vortex-forming plate.

According to the aforementioned configuration, the gas flow can be generated inside a certain space so that a less turbulent vortex is formed.

Further, in the above embodiment, a curved shape or tapered shape is formed on a wall surface around an opening portion of the transmission hole continuous with the space for generating the circular flow.

According to the aforementioned configuration, debris can be smoothly extracted since air resistance at the opening portion of the vortex-forming plate is reduced.

According to an embodiment of the debris extraction mechanism and debris extraction method, debris generated when pattern processing is performed on a transparent conductive film on a processing object can be extracted efficiently.

Therefore, according to the laser processing apparatus and laser processing method using the debris extraction mechanism and debris extraction method, since debris generated from the processed object when irradiating the laser light is efficiently removed, debris re-deposited on the processed object can be reduced so that the accuracy and quality of the pattern processing can be improved.

DETAILED DESCRIPTION

An embodiment is explained below with reference to FIGS. 2 through 8.

According to an embodiment a laser processing apparatus and a laser processing method as provided, as well as, a debris extraction mechanism and a debris extraction method for removing and extracting debris generated when a transparent conductive film is formed on a multilayer film formed on a glass substrate that is a processing object. Debris includes particles and products generated during laser processing based on ablation, thermofusion or composite action thereof by irradiating a surface of a transparent conductive film with laser light. In the following explanations, such particles and products before and after deposition generated during the laser processing are termed debris.

A laser processing apparatus according to an embodiment has a laser light source and an optical system for optically projecting laser light emitted from the laser light source onto a processed surface of a processing object in a predetermined pattern. Further, a debris extraction mechanism having an outlet hole opened thereto is provided considerably close to a transparent conductive film on the processing object. The laser light is radiated from one side of the debris extraction mechanism, and a gas atmosphere in the vicinity of the surface of the transparent conductive film irradiated with laser light is discharged from the outlet hole of the debris extraction mechanism. The surface of the transparent conductive film irradiated with laser light can be brought in a decompressed atmosphere by a simplified structure in the case where the irradiation of laser light is performed using the laser processing apparatus according to an embodiment. Hence, a sublimation pressure rises high when the transparent conductive film is detached from a resin layer or the like of a lower layer during the laser light irradiation, and so irradiation energy necessary for the processing can be reduced. Further, gas directed over a surface in the vicinity of a processed region, which includes debris detached from the resin layer by the irradiation of the laser light, can be removed efficiently through the outlet hole of the debris extraction mechanism.

Figure 1:
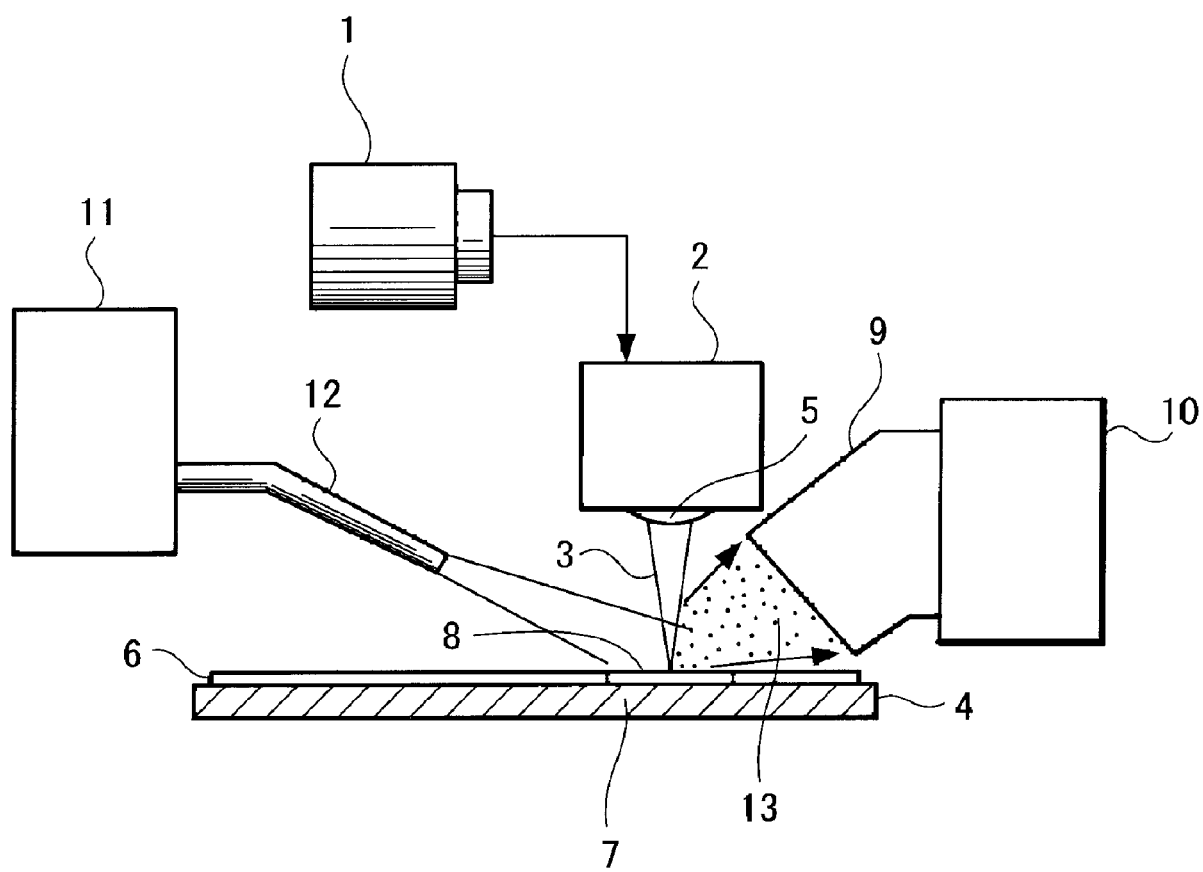
FIG. 1 is a schematic constitutional diagram showing an example of a related art laser processing apparatus.
Figure 2:
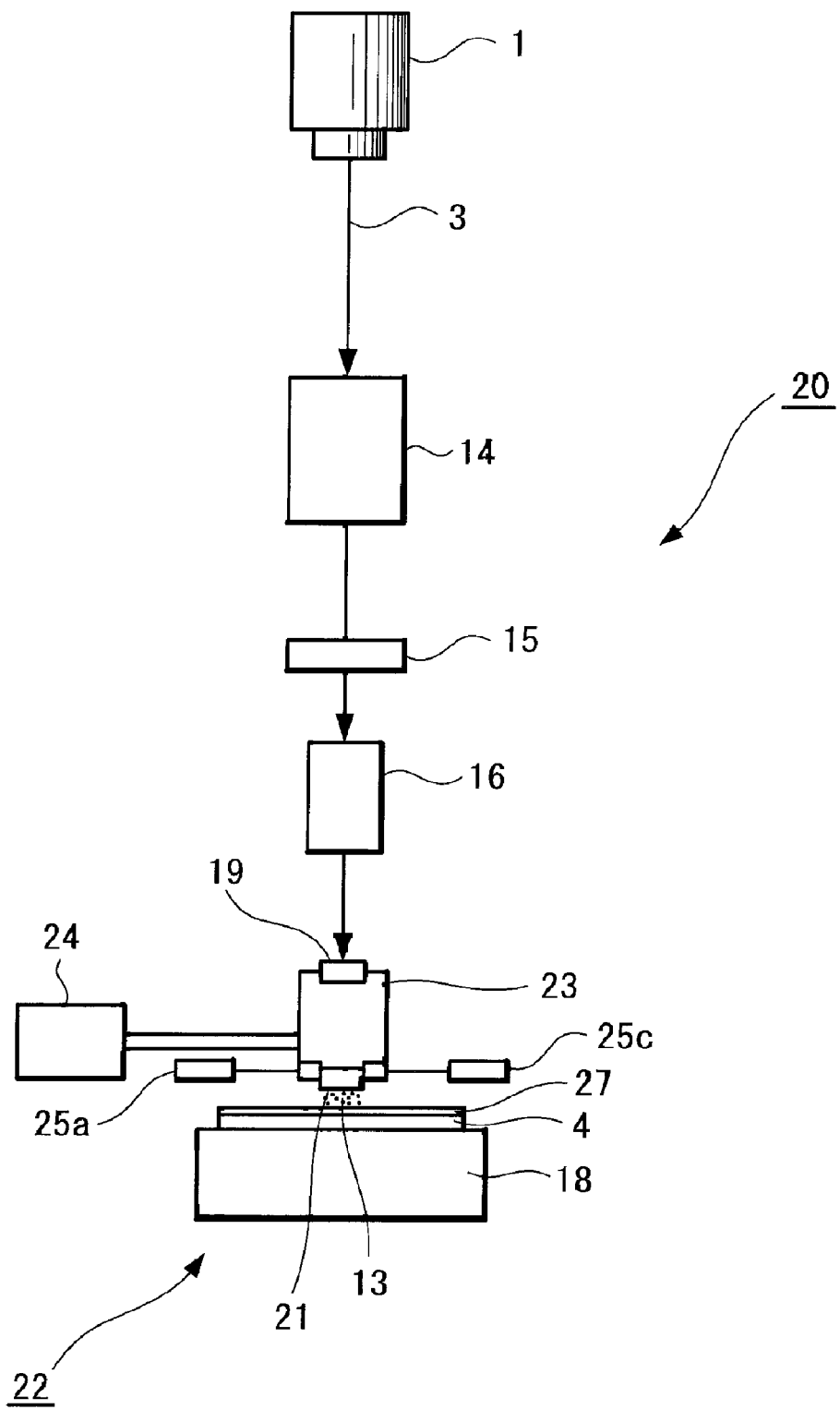
FIG. 2 is a constitutional diagram schematically showing the whole of a laser processing apparatus according to an embodiment.

A laser processing apparatus according to an embodiment is hereinafter explained with reference to FIG. 2. FIG. 2 is a schematic diagram showing a laser optical system and a debris extraction device according to an embodiment. In FIG. 2, the same reference numerals are given to portions corresponding to those in FIG. 1.

As shown in FIG. 2, a laser processing apparatus 20 includes a laser control apparatus 1 having a laser light source, and laser light 3 emitted from the laser light source of the laser control apparatus 1 is made into a predetermined shape and size through a beam shaper 14. After that, the laser light 3 is made into a predetermined patterning shape through a mask or variable aperture 15. The laser light 3 made into the predetermined patterning shape is transmitted through a projection lens 16 and a transparent conductive film 27 is irradiated with the laser light 3 passing through an upper side transmission window 19 and a transmission hole 21 in a debris extraction module 22.

Specifically, the debris extraction module 22 is irradiated by the laser light 3. The debris extraction module 22 is configured to have a mechanism for extracting debris 13 generated when patterning the transparent conductive film 27 on a multilayer film formed on a surface of a glass substrate 4 that is a processing object mounted on a stage 18. Then, the transparent conductive film 27 formed on the surface of the substrate 4 is irradiated with the laser light 3 transmitted through the upper side transmission window 19 formed in an upper portion of a case 23 of the debris extraction module 22 and the transmission hole 21 formed in a bottom portion of the case 23. A discharge pump 24 and four pipes that constitute gas inlet portions 25a through 25d are protruded from the case 23 of the debris extraction module 22. In FIG. 2, only the transparent conductive film 27 is shown among the multilayer film laminated on the substrate 4. However, it should be appreciated that the multilayer film is not limited to the embodiment of FIG. 2 and may include other suitable resin layers and metal layers.

An excimer laser, for example, is used for the laser light source of the laser control apparatus 1. There are several kinds of excimer lasers each having different laser medium, and those are XeF (351 nm), XeCl (308 nm), KrF (248 nm), ArF (193 nm) and F2 (157 nm) in order of increasing wavelength. However, it should be appreciated that the laser is not limited to an excimer laser but may be a solid-state laser, CO2 laser or the like.

The beam shaper 14 shapes the laser light 3 emitted from the laser light source and equalizes the strength of beams to be output. The mask or variable aperture 15 has a predetermined patterning shape and passes the laser light 3 shaped by the beam shaper 14 to be processed into a beam of the predetermined pattern. For example, a perforated mask formed of metal material, a photomask formed of transparent glass material or metal thin film, a dielectric mask formed of dielectric material, and the like are used for this mask or variable aperture 15. The projection lens 16 is provided to make the laser light 3 that passes through the pattern of the mask or variable aperture 15 projected with a predetermined magnification onto the processed surface of the substrate 4 that is the processing object on the stage 18.

The stage 18 is disposed such that the laser light 3 projected from the projection lens 16 focuses on the processed surface of the substrate 4. This stage 18 has an X-Y stage structure, a three axes stage structure or the like capable of being moved and positioned along a plane vertical to an optical axis of the laser light 3 such that the processed surface of the substrate 4 that is the processing object can be scanned by the laser light 3.

Figure 3:
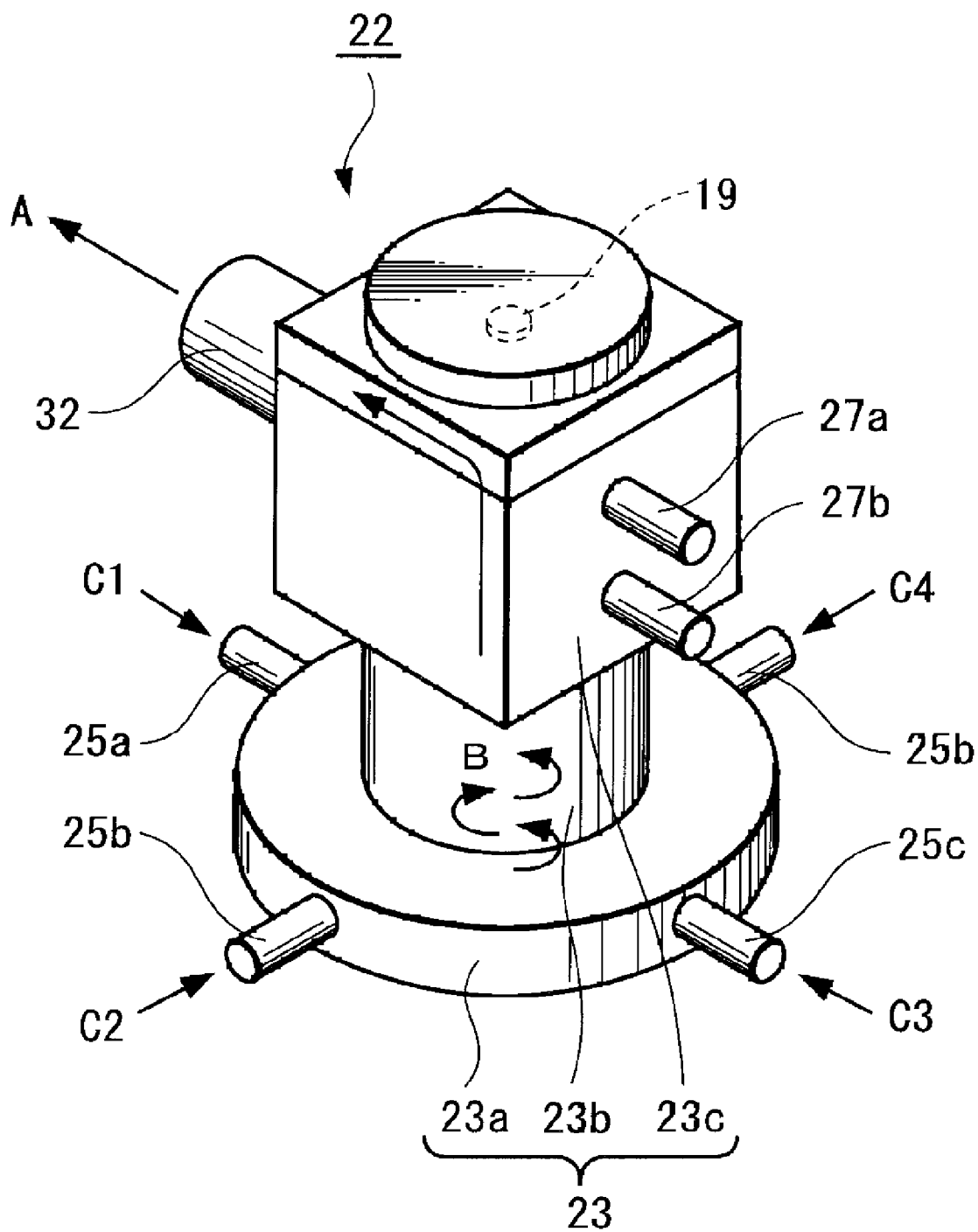
FIG. 3 is a perspective view showing a debris extraction mechanism used for the laser processing apparatus according to an embodiment.

FIG. 3 shows a perspective view of the debris extraction module 22 that includes the debris extraction mechanism. The case 23 of the debris extraction module 22 is configured to have an approximately disc-shaped vortex-forming substrate 23a disposed facing the processing object, a cylindrical gas outlet portion 23b provided upright at an approximately center position of this vortex-forming substrate 23a and an approximately cubic chamber 23c mounted on this gas outlet portion 23b. Those members constituting the case 23 are made from aluminum, stainless steel or the like. The vortex-forming substrate 23a functions as a vortex-forming portion, and the gas outlet portion 23b and the chamber 23c function as a vortex flow outlet portion.

The upper side transmission window 19 made of quartz in case of KrF laser and made of calcium fluoride in case of ArF laser, for example, through which the laser light 3 is transmitted, is formed in the upper part of the chamber 23c, and an outlet hole 32 is bored in one lateral plate of the chamber 23c. An outlet duct (not illustrated) is fit into this outlet hole 32 and the extracted debris 13 is discharged in the direction shown by an arrow A using the discharge pump 24 shown in FIG. 2.

Further, gas inlet portions 27a and 27b to bring in gas for floating the debris extraction module 22 are formed in the other lateral side of the chamber 23c. A vortex-forming mechanism is provided in the gas outlet portion 23b and the vortex-forming substrate 23a under the chamber 23c, and the debris 13 is collected spirally shown by an arrow B into the center of the vortex-forming substrate 23a to be extracted. As shown in FIG. 3, the gas inlet portions 25a, 25b, 25c, 25d are disposed at positions with which a circumference of the vortex-forming substrate 23a is divided into quarters, and gas is supplied from directions of arrows C1, C2, C3, C4 to those gas inlet portions 25a, 25b, 25c, 25d respectively, so that the gas is brought inside the vortex-forming substrate 23a.

The gas brought in from the gas inlet portions is called an assist gas, and helium, neon or other inert gas, nitrogen and the like can be listed in addition to CDA (Clean Dry Air). By thus supplying the assist gas to the inside of the vortex-forming substrate 23a in the vicinity of the laser light irradiated surface, the generation of the debris can be controlled.

Figure 4:
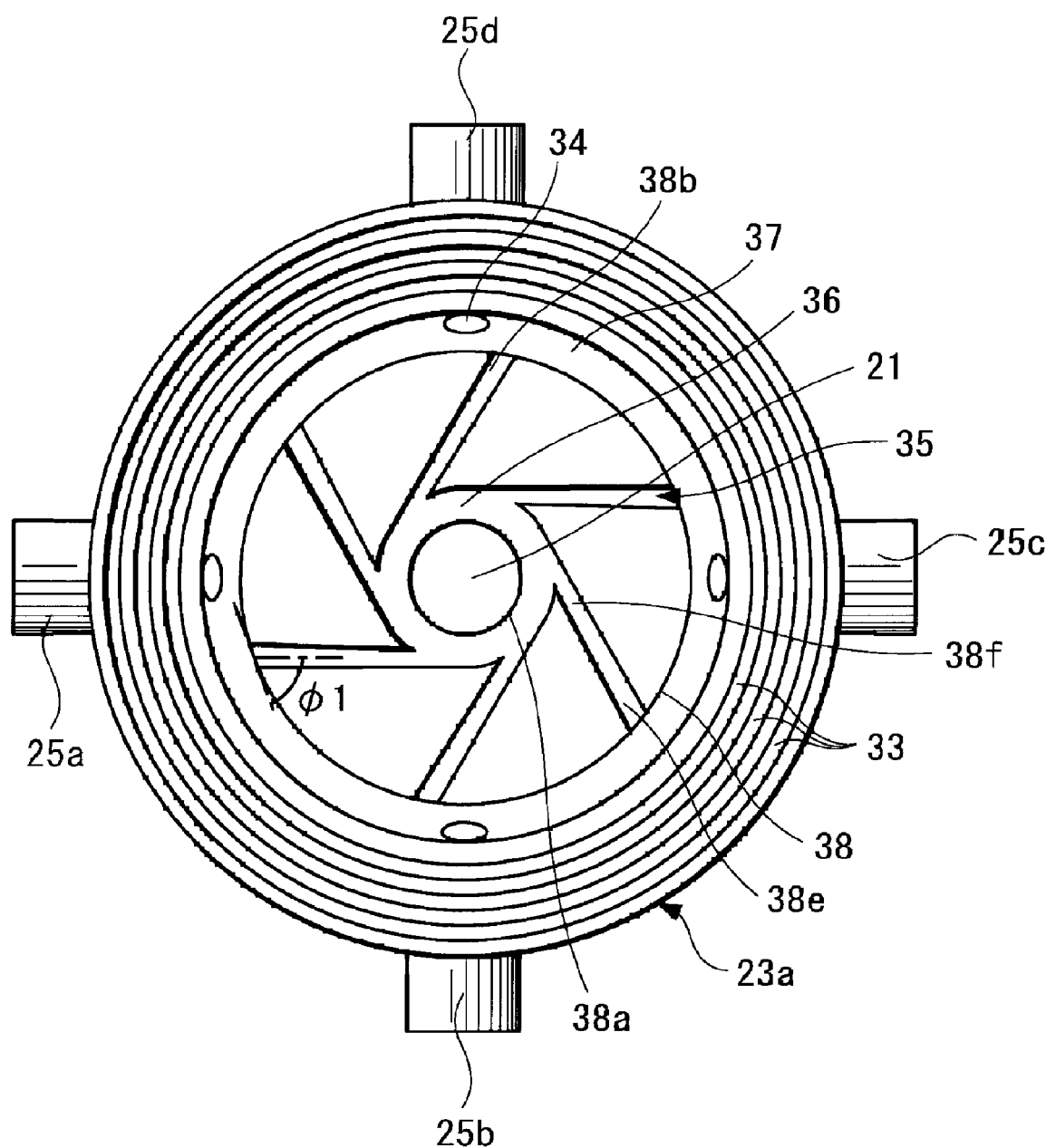
FIG. 4 is a bottom view showing a base portion of the debris extraction mechanism used for the laser processing apparatus according to an embodiment.

FIG. 4 shows the vortex-forming mechanism formed in the lower surface of the approximately disc-shaped vortex-forming substrate 23a constituting the case 23 of the debris extraction module 22. FIG. 4 is a view showing the vortex-forming substrate 23a from the lower side. The transmission hole 21 for transmitting the laser light 3 is formed in the center of the disc of vortex-forming substrate 23a. Further, a vortex-forming plate 38 shown in FIG. 7 which forms a vortex is disposed concentrically around this transmission hole 21.

Figure 7:
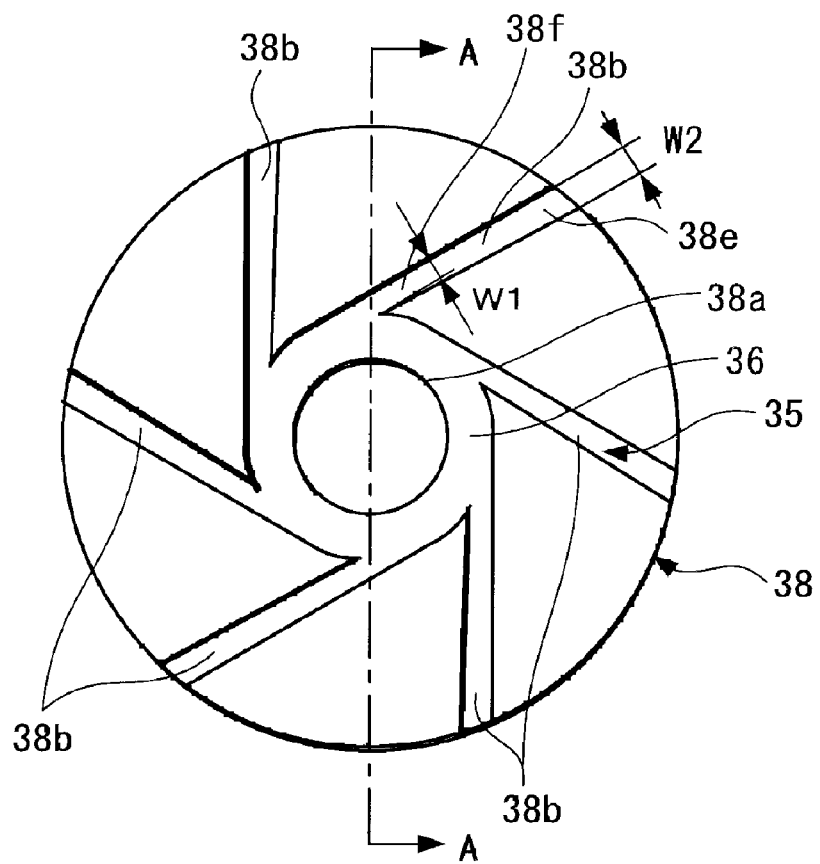
FIG. 7 is a plan view showing a vortex-forming plate of the debris extraction mechanism used for the laser processing apparatus according to an embodiment.
Figure 8:
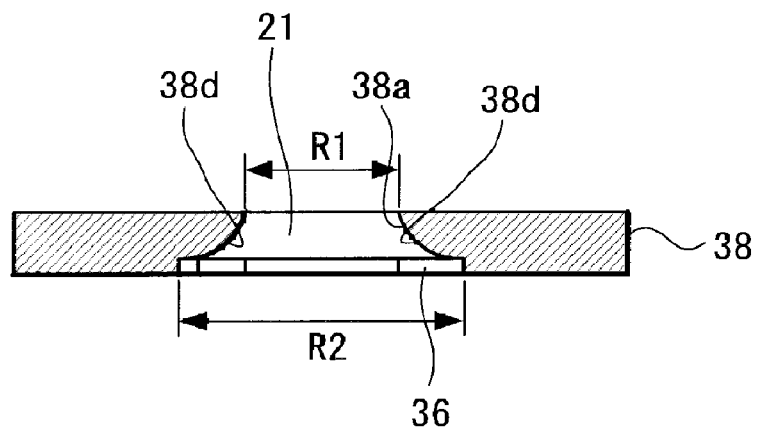
FIG. 8 is a cross-sectional view taken by A-A line of FIG. 7.

As shown in FIGS. 7 and 8, an inner diameter 38a that is the same diameter as the transmission hole 21 is bored in the center portion of this vortex-forming plate 38 made of metal such as aluminum formed into an approximately disc shape. Further, a vortex-forming space 36 having an approximately hexagonal groove (or approximately circular groove) is formed surrounding the inner diameter 38a, in other words, between the transmission hole 21 and vortex-forming grooves 35. This vortex-forming space 36 functions as a space for forming a vortex flow (circular flow) as explained later on with reference to FIG. 5, in which gas supplied from each of the vortex-forming grooves 35 to the vortex-forming space 36 collides with a wall surface of the vertex-forming plate 38 (refer to FIG. 8), the collided gas flows along the wall surface of the vortex-forming plate 38, and so the circular flow is generated. By sucking this circular flow upward using the discharge pump 24 shown in FIG. 2, a less turbulent vortex is formed.

Six radial grooves 38b each having a groove width of W2 (refer to FIG. 7) are formed from an inner circumference side toward an outer circumference side along each side of the hexagonal shape of the vortex-forming space 36. Those radial grooves 38b each function as the vortex-forming grooves 35 for collecting the debris 13 generated by the irradiation of the laser light 3 into the inner diameter 38a of the center at a high velocity.

On a surface of the vortex-forming plate 38 facing the substrate 4, each of those vortex-forming grooves 35 has a predetermined angle φ1 formed with a tangent line drawn at a contact point between a later-described concentric groove 37 that is concentric with the transmission hole 21 and a center axis of this vortex-forming groove 35. Also, each vortex-forming groove 35 is continuous with the transmission hole 21 through the vortex-forming space 36. The angle φ1 is determined depending on a direction of gas (rotational direction of vortex flow) that flows in the concentric groove 37. In the case where the gas flows in the counterclockwise direction in the concentric groove 37 in FIG. 4, for example, the vortex-forming groove 35 is formed such that the angle φ1 formed between the vortex-forming groove 35 and the tangent line is located on the leeward side and the angle φ1 at this time becomes an acute angle. On the other hand, an angle (180-φ1) formed between the vortex-forming groove 35 on the windward side and the tangent line becomes an obtuse angle.

In order for the debris 13 scattered from the processed surface to be collected into the vortex-forming space 36 at a high velocity, each radial groove 38b constituting the vortex-forming groove 35 shown in FIG. 7 is set to have a predetermined opening ratio. Specifically, a groove width W2 of a supply portion 38e for supplying the gas on the outer circumference side of the disc becomes is larger than a groove width W1 of an outlet portion 38f for discharging the gas on the side of the vortex-forming space 36. For example, it is preferable that the opening ratio between the groove width W1 around the outlet portion 38f and the groove width W2 around the supply portion 38e is selected to be the ratio of W1:W2=1:1.5 to 2.5. Thus, with the appropriate opening ratio being given to the outlet portion side and supply portion side of the vortex-forming groove 35 provided in the vortex-forming plate 38, a flow velocity of the gas flowing into the vortex-forming space 36 is improved. Accordingly, the debris 13 can be easily entrapped into the vortex when the rectified gas is brought in the vortex-forming plate 38 from the concentric groove 37.

Further, in order to efficiently extract the debris 13 collected into the vortex-forming space 36 in the center of the vortex-forming plate 38, an R-shape (curved) or tapered shape 38d as shown in FIG. 8 is formed in the inner diameter 38a around an opening portion of the transmission hole 21. More specifically, the tapered shape 38d is formed in a wall surface portion where the transmission hole 21 is connected to the vortex-forming space 36. By doing so, since the air resistance of the opening portion of the vortex-forming plate 38 is reduced, debris can be discharged without difficulty.

If the vortex-forming space 36 provided on the inner circumference side of the vortex-forming plate 38 is too wide, than a vortex may not form. In order to generate a less turbulent vortex flow, specifically, to generate an appropriate circular flow in the vortex-forming space 36 it is suitable to make a diameter R2 of the vortex-forming space 36 at least within about 1.5 times the diameter R1 of the transmission hole 21. This vortex-forming space 36 is fixed concentrically with the transmission hole 21 of the vortex-forming substrate 23*a* using a screw hole (not illustrated) bored in the vicinity of an outer circumference of a convex portion having an approximately triangular shape remaining in the vortex-forming plate 38, for example. However, it should be appreciated that the vortex-forming plate 38 may be molded integrally with the vortex-forming substrate 23*a*.

Further, as shown in FIG. 4, in order to form a less turbulent vortex, the concentric groove 37 continuous with the vortex-forming grooves 35 is formed around the vortex-forming plate 38 that is fixed to the vortex-forming substrate 23*a*. Four gas supply holes 34 continuous with the gas inlet portions 25*a*, 25*b*, 25*c*, 25*d* are bored at the positions dividing the concentric groove 37 into quarters. As described above, the (circular) groove concentric with the transmission hole 21 is provided on the outer circumference side of the vortex-forming plate 38 at a stage portion where gas flows into the vortex-forming plate 38 at the bottom of the vortex-forming mechanism. Hence, the flow of the gas brought in through each gas supply hole 34 is rectified to correspond to the rotational direction of the vortex (i.e., in the direction corresponding to vortex-forming grooves 35 provided in the vortex-forming plate 38). By supplying the gas flow to the vortex-forming groove 35, a less turbulent vortex is formed in the vortex-forming space 36. The number of gas supply holes 34 is four in this embodiment. However, it should be appreciated that the number is not limited thereto and may be any suitable number of holes.

A plurality of float grooves 33 for floating the debris extraction module 22 from the processing object are added around the concentric groove 37. The debris extraction module 22 is floated by blowing gas from a gas blowing hole (not illustrated) into those float grooves 33. As a result, an unevenness of the irradiated surface of the substrate 4 that is the processing object is absorbed and a distance from the debris extraction module 22 to the irradiated surface can be maintained at a range of about 50 μm to about 100 μm. Accordingly, a focus adjustment is not necessary and the debris 13 is extracted easily.

Figure 6:
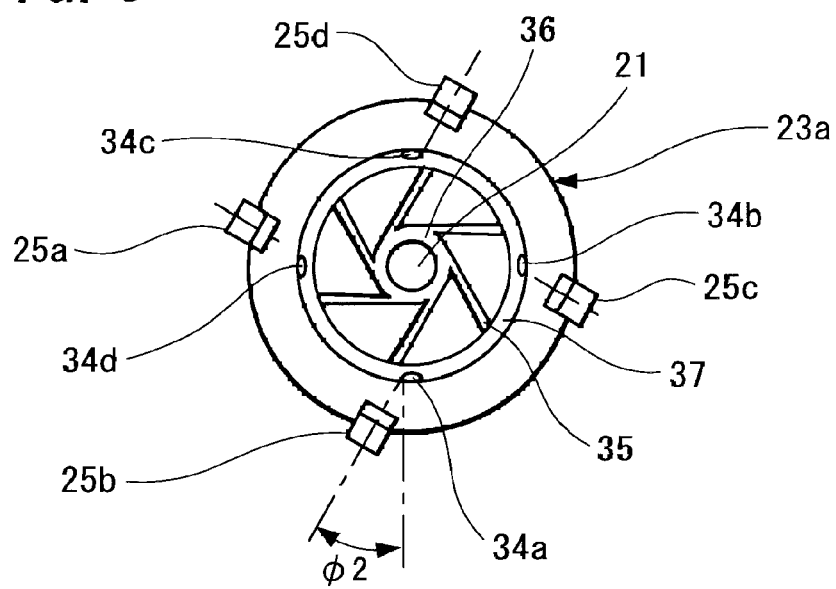
FIG. 6 is a plan view for explaining a method of generating concentric flow by a concentric groove of the debris extraction mechanism used for the laser processing apparatus according to an embodiment.

Here, as shown in FIG. 6, in order to maximize debris extraction capability, vortexes are formed with minimal turbulence so that the debris 13 may be effectively collected into the center. In this regard, each of the gas inlet portions 25*a*, 25*b*, 25*c*, 25*d* has a certain angle φ2 (ideally, 90 degrees) with respect to the gas supply holes 34 that supply gas into the concentric groove 37. That is, with respect to the straight lines connecting the center of the transmission hole 21 to each of the gas supply holes 34*a*, 34*b*, 34*c*, 34*d*, a center axis of each of the gas inlet portions 25*a*, 25*b*, 25*c*, 25*d* is disposed to correspond with the direction of each vortex-forming groove 35 respectively. In other words, each of the gas inlet portions is disposed to have the angle φ2 corresponding to the direction of the gas flow generated in the concentric groove 37. When a gas flow in the counterclockwise direction is generated in the concentric groove 37, as shown in FIG. 6, for example, the gas flowing in the concentric groove 37 is taken into each vortex-forming groove 35 smoothly with less resistance. In the case where the gas flow in the counterclockwise direction is thus generated in the concentric groove 37, each of the gas inlet portions 25*a*, 25*b*, 25*c*, 25*d* is provided with an inclination of the angle φ2 on the windward side. By doing so, a rectified circular flow in the counterclockwise direction that corresponds with the direction of each vortex-forming groove 35 is generated in the concentric groove 37 so that an efficient vortex flow can be formed.

Figure 5:
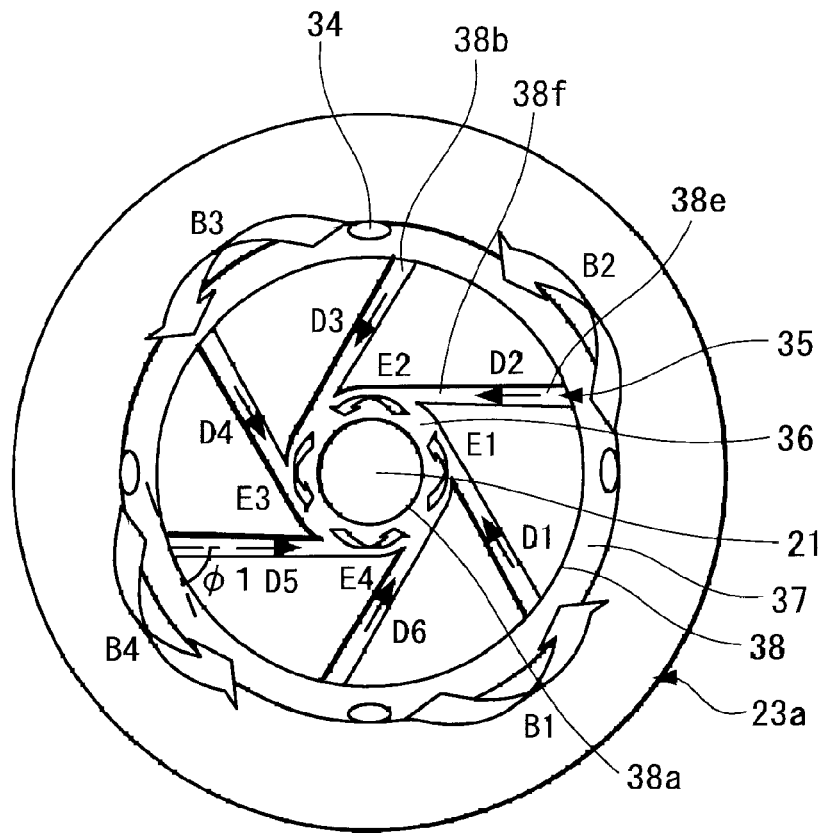
FIG. 5 is a bottom view of the base portion for explaining a method of generating vortex in the debris extraction mechanism used for the laser processing apparatus according to an embodiment.

A method of generating a vortex in the configuration described above is explained with reference to FIG. 5. Similar to FIG. 4, FIG. 5 shows the bottom surface of the vortex-forming substrate 23*a*. Gas supplied from four gas supply holes 34 that are bored in the concentric groove 37 formed in the outer circumference of the vortex-forming plate 38 generates a circular flow in the counterclockwise direction along the concentric groove 37 as shown with arrows B1, B2, B3, B4. The gas enters from the supply portions 38*e* on the gas supply side, continues through the radial grooves 38*b* formed continuously from the transmission hole 21 in the radial direction, and is discharged from the outlet portions 38*f* on the side of the transmission hole 21. These gas flow paths are shown with arrows D1, D2, D3, D4, D5, D6. Accordingly, circular flow is generated in the counterclockwise direction as indicated by arrows E1, E2, E3, and E4 in the circumferential portion of the vortex-forming space 36. Further, using the discharge pump 24 which makes ascending flow act on the circular flow atmosphere shown with the arrows E1, E2, E3, E4, a vortex flow or spirally ascending flow is generated inside the gas outlet portion 23*b* and the chamber, and so the gas ascending inside the transmission hole 21 is discharged to the outside through the outlet hole 32.

According to an embodiment of the debris extraction mechanism and debris extraction method, debris generated when performing pattern processing on a transparent conductive film on a processing object can be extracted efficiently. Therefore, according to the laser processing apparatus and laser processing method which use the debris extraction mechanism and debris extraction method, since debris generated from the processed object when irradiating the laser light is efficiently removed, debris re-deposited on the processed object can be reduced so that the accuracy and quality of patterning can be improved. Thus, high quality patterning of a transparent conductive film by using a laser can be performed, and debris can be removed totally by this newly devised process that replaces a photolithography process.

Further, an angle is formed between the concentric groove 37 and the flow of the gas supplied thereto in the above-described embodiment. Accordingly, the flow of the gas into the vortex-forming plate 38 is rectified such that a less turbulent vortex flow is formed.

Further, the radial grooves 38*b* to form a vortex are provided for the vortex-forming plate 38 and a predetermined opening ratio is given thereto in the above-described embodiment. Therefore, the flow velocity of the gas flowing into the vortex-forming space is improved such that debris can easily be entrapped into the vortex.

Furthermore, the vortex-forming space 36 having a diameter equal to or less than 1.5 times the diameter of the transmission hole 21, for example, is provided for the vortex-forming plate 38 in the above-described embodiment a less turbulent vortex is formed.

Furthermore, debris entrapped in a vortex is discharged from the transmission hole 21 for the discharge by adding R-shape or tapered shape 38*d* to the inner diameter 38*a* provided for the vortex-forming space 36 in the above-described embodiment such that the air resistance of the vortex at the opening portion of the vortex-forming space 36 is reduced to efficiently extract debris.

Further, debris is collected by a vortex flow into the transmission hole 21 in the center of the area irradiated with the laser light in the above-described embodiment such that it is possible to control the scattering of debris in an area surrounding the laser light irradiated portion. Furthermore, since the debris is collected into the transmission hole 21 in the center of the laser-irradiated area even if debris remains in the laser-irradiated portion, such debris is irradiated with the overlapped laser light so that the debris can be removed completely.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A laser processing apparatus for performing pattern processing of a transparent conductive film that is formed on a multilayer film on a substrate by using laser light, comprising:
    debris extraction means having a vortex generation mechanism that generates a vortex flow by directing gas into the vicinity of a laser-irradiated portion of said transparent conductive film,
    wherein the debris extraction means is proximal to the substrate and functions to remove laser irradiation generated debris by entrapping pre-deposited and post-deposited debris in to the vortex flow to be extracted to the outside with said gas,
    wherein said debris extraction means includes a vortex flow outlet portion provided with a transmission hole being an optical path of the laser light as well as being a flow path of the vortex flow leading to an outlet hole and a vortex-forming portion disposed facing said substrate,
    wherein said vortex-forming portion includes a vortex-forming plate in which radial vortex-forming grooves corresponding to a rotational direction of said vortex flow and being continuous with said transmission hole are formed in a surface of said vortex-forming portion facing the substrate,
    wherein a space for generating a circular flow is provided between said transmission hole in said vortex flow outlet portion and the vortex-forming grooves in said vortex-forming plate, and
    wherein gas is brought into the vortex-forming grooves of said vortex-forming plate to form the vortex flow, and is discharged from said outlet hole to the outside through the transmission hole of said vortex flow outlet portion.

2. A laser processing apparatus according to claim 1, wherein each of said vortex-forming grooves is formed to have an acute angle on the leeward side of said vortex flow with respect to angles formed by the vortex-forming groove and a line tangent to a concentric circle with said transmission hole.

3. A laser processing apparatus according to claim 1, wherein a circular groove continuous with said vortex-forming grooves is provided on an outer circumference side in the surface of said vortex-forming plate facing said substrate; and
    wherein gas is brought in from gas supply holes formed in said circular groove so that the gas is supplied to said vortex-forming grooves and a gas flow in the same rotational direction as said vortex flow is generated inside said circular groove.

4. A laser processing apparatus according to claim 3,
    wherein gas inlet portions for directing gas into the gas supply holes formed in said circular groove are provided; and
    wherein said gas inlet portions are disposed corresponding to disposition of said vortex-forming grooves, being inclined to the windward side in the rotational direction of the vortex flow generated with respect to straight lines connecting the center of said transmission hole and the gas supply holes of said circular groove.

5. A laser processing apparatus according to claim 1,
    wherein in said vortex-forming plate a groove width of said vortex-forming groove on the side of said circular groove is larger by a predetermined ratio than a groove width of the vortex-forming groove on the side of said transmission hole.

6. A laser processing apparatus according to claim 5,
    wherein W1:W2 ranges from about 1:1.5 to about 2.5, where W1 is the groove width of said vortex-forming groove formed in said vortex-forming plate on the side of said transmission hole and W2 is the groove width of the same on the side of said circular groove.

7. A laser processing apparatus according to claim 1,
    wherein a curved shape or tapered shape is formed in a wall surface around an opening portion of said transmission hole continuous with said space for forming the circular flow.

8. A laser processing method of performing pattern processing of a transparent conductive film that is formed on a multilayer film on a substrate by using laser light, the method comprising:
    a) generating a vortex flow by directing gas into the vicinity of a laser-irradiated portion of said transparent conductive film using a debris extraction module which includes
        a vortex flow outlet portion provided with a transmission hole being an optical path of the laser light as well as being a flow path of the vortex flow leading to an outlet hole and a vortex-forming portion,
        wherein said vortex-forming portion includes a vortex-forming plate in which radial vortex-forming grooves corresponding to a rotational direction of said vortex flow and being continuous with said transmission hole are formed in a surface of said vortex-forming portion facing the substrate, and
        wherein a space for generating a circular flow is provided between said transmission hole in said vortex flow outlet portion and the vortex-forming grooves in said vortex-forming plate,
        said debris extraction module thus having a vortex generation mechanism disposed in proximity to said substrate; and
    b) extracting laser irradiation generated debris prior to deposition and after deposition on said substrate, by entrapping said debris into said vortex flow to be extracted to the outside with said gas which is brought into the vortex-forming grooves of said vortex-forming plate to form the vortex flow, and is discharged from said outlet hole to the outside through the transmission hole of said vortex flow outlet portion.

9. A debris extraction mechanism for removing debris generated by laser irradiation when performing pattern processing of a transparent conductive film that is formed on a multilayer film on a substrate by using laser light, comprising:
    a vortex flow outlet portion provided with a transmission hole being an optical path of the laser light as well as being a flow path of the vortex flow leading to an outlet hole and a vortex generation portion for generating a vortex flow by flowing gas into the vicinity of a laser-irradiated portion of said transparent conductive film, wherein said vortex generation portion is disposed facing said substrate and includes a vortex-forming plate in which radial vortex-forming grooves corresponding to a rotational direction of said vortex flow and being continuous with said transmission hole are formed in a surface of said vortex-forming portion facing the substrate, wherein a space for generating a circular flow is provided between said transmission hole in said vortex flow outlet portion and the vortex-forming grooves in said vortex-forming plate, and wherein gas is brought into the vortex-forming grooves of said vortex-forming plate to form the vortex flow, and is discharged from said outlet hole to the outside through the transmission hole of said vortex flow outlet portion, such that debris deposited on said substrate and suspended debris is entrapped into said vortex flow by said vortex generation portion disposed in proximity to said substrate to be extracted to the outside with said gas.

10. A debris extraction method of removing debris generated by laser irradiation when performing pattern processing of a transparent conductive film that is formed on a multilayer film on a substrate by using laser light, the method comprising:

a) generating a vortex flow by directing gas into the vicinity of a laser-irradiated portion of said transparent conductive film using a vortex generation portion disposed in proximity to said substrate and using a vortex flow outlet portion provided with a transmission hole being an optical path of the laser light as well as being a flow path of the vortex flow leading to an outlet hole, wherein said vortex generation portion is disposed facing said substrate and includes a vortex-forming plate in which radial vortex-forming grooves corresponding to a rotational direction of said vortex flow and being continuous with the transmission hole are formed in a surface of said vortex-generation portion facing the substrate, and wherein a space for generating a circular flow is provided between said transmission hole in said vortex flow outlet portion and the vortex-forming grooves in said vortex-forming plate; and b) extracting debris deposited on said substrate and suspended debris by entrapping said debris into said vortex flow to be extracted to the outside with said gas which is brought into the vortex-forming grooves of said vortex-forming plate to form the vortex flow, and is discharged from said outlet hole to the outside through the transmission hole of said vortex flow outlet portion.

11. A laser processing apparatus for performing pattern processing of a transparent conductive film that is formed on a multilayer film on a substrate by using laser light, the laser processing apparatus comprising:

a debris extraction module having a vortex generation mechanism that generates a vortex flow by directing gas into the vicinity of a laser-irradiated portion of said transparent conductive film, wherein said debris extraction module includes a vortex flow outlet portion provided with a transmission hole being an optical path of the laser light as well as being a flow path of the vortex flow leading to an outlet hole and a vortex-forming portion disposed facing said substrate, wherein said vortex-forming portion includes a vortex-forming plate in which radial vortex-forming grooves corresponding to a rotational direction of said vortex flow and being continuous with said transmission hole are formed in a surface of said vortex-forming portion facing the substrate, wherein a space for generating a circular flow is provided between said transmission hole in said vortex flow outlet portion and the vortex-forming grooves in said vortex-forming plate, wherein said debris extraction module is disposed in proximity to said substrate, and wherein gas is brought into the vortex-forming grooves of said vortex-forming plate to form the vortex flow and is discharged from said outlet hole to the outside through the transmission hole of said vortex flow outlet portion and debris deposited on said substrate and suspended debris is entrapped into said vortex flow to be extracted to the outside with said gas.

* * * * *